United States Patent
Kablau

(10) Patent No.: US 7,965,617 B2
(45) Date of Patent: Jun. 21, 2011

(54) OPTICAL DATA STORAGE MEDIUM, APPARATUS AND METHOD FOR SCANNING SUCH A MEDIUM

(75) Inventor: Johannes Gerardus Fredericus Kablau, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 531 days.

(21) Appl. No.: 11/913,682

(22) PCT Filed: Apr. 28, 2006

(86) PCT No.: PCT/IB2006/051324
§ 371 (c)(1),
(2), (4) Date: Aug. 7, 2008

(87) PCT Pub. No.: WO2006/120591
PCT Pub. Date: Nov. 16, 2006

(65) Prior Publication Data
US 2008/0304400 A1    Dec. 11, 2008

(30) Foreign Application Priority Data
May 9, 2005 (EP) .................................. 05103838

(51) Int. Cl.
*G11B 7/24* (2006.01)

(52) U.S. Cl. .................................................. 369/275.4

(58) Field of Classification Search .................... None
See application file for complete search history.

(56) References Cited

U.S. PATENT DOCUMENTS

| | | | |
|---|---|---|---|
| 5,818,805 A | 10/1998 | Kobayashi et al. | |
| 6,908,725 B2 * | 6/2005 | Blankenbeckler et al. | 430/270.13 |
| 2001/0038603 A1 * | 11/2001 | Kondo et al. | 369/275.2 |
| 2003/0223339 A1 * | 12/2003 | Taniguchi et al. | 369/53.22 |
| 2004/0156289 A1 * | 8/2004 | Iida et al. | 369/53.21 |
| 2004/0165494 A1 | 8/2004 | Suh et al. | |

FOREIGN PATENT DOCUMENTS

| | | |
|---|---|---|
| EP | 1 515 332 A1 | 3/2005 |
| JP | 2004-227640 | 8/2004 |
| WO | 03083845 A1 | 10/2003 |
| WO | 03094158 A1 | 11/2003 |
| WO | 2004025633 A1 | 3/2004 |

OTHER PUBLICATIONS

G. Bouwhuis et al; "Principles of Optical Disc Systems", pp. 75-80, 1985.
Written Opinion of the International Searching Authority for International Application No. PCT/IB2006/051324.

* cited by examiner

*Primary Examiner* — Daniell L Negrón
*Assistant Examiner* — Henok Heyi

(57) ABSTRACT

An optical data storage medium (1) comprising a dye-based recording layer is described. It has substantially parallel tracks for recording user information in a pattern of optically detectable marks, the tracks being provided with a guide groove, the groove being present in a user data area (3) and in an information area (2) and being trackable by a focused radiation beam (7) with the push pull method. The value of the normalized push pull signal (PPN) in the unrecorded information area is PPN-i and the value of PPN in the unrecorded user data area is PPN-u and PPN-i is lower than PPN-u. It is achieved that the information area of such an optical data storage may be read by a legacy optical data drive without causing damage to the drive. Further an apparatus for reading and a corresponding method are described.

5 Claims, 2 Drawing Sheets

OPTICAL DATA STORAGE MEDIUM, APPARATUS AND METHOD FOR SCANNING SUCH A MEDIUM

Figure 1:
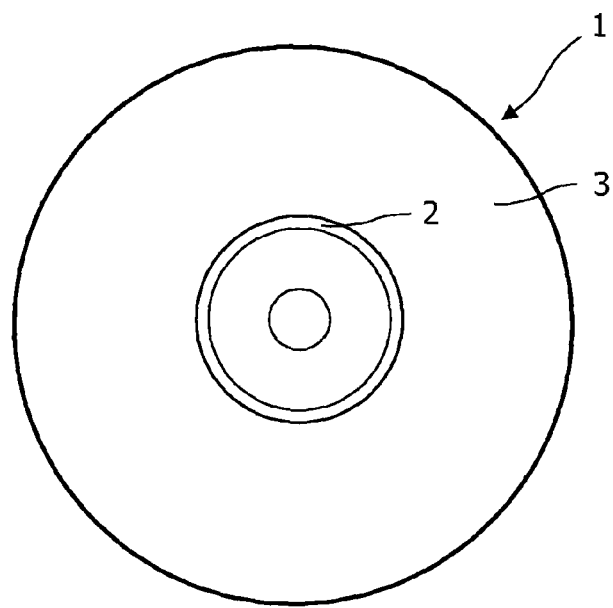

The invention relates to an optical data storage medium comprising a dye based recording layer and having substantially parallel tracks for recording user information in a pattern of optically detectable marks, the tracks being provided with a guide groove, the groove being present in a user data area and in an information area and being trackable by a focused radiation beam with the push pull method.

The invention also relates to an apparatus and method for scanning such an optical data storage medium.

The recorded information on an optical data storage medium is arranged in tracks. In general, a track is a line on the record carrier to be followed by a scanning device and which has a length of the order of a characteristic dimension of the record carrier. A track on a rectangular record carrier has a length substantially equal to the length or width of the optical data storage medium. A track on a disc-shaped optical data storage medium is a 360 degrees turn of a continuous spiral line or a circular line on the disc.

A track may comprise a groove and/or a land portion between grooves. A groove is a trench-like feature in the recording layer, separated from neighbouring grooves by land portions of the recording layer, the bottom of the trench being nearer to or further away from the side of the record carrier on which the radiation impinges for scanning it. User information may be recorded on the lands and/or in the grooves in the form of optically detectable areas in the recording layer, e.g. as areas having a characteristic reflection or magnetization.

Regarding the market for optical recording, it is clear that the most important and successful format so far is a write-once format. Next to the Compact Disk Recordable (CD-R) and Digital Versatile Disk Rewritable (DVD+R and DVD-R) recently a new Blu-ray Disc recordable (BD-R) standard was developed which provides an even greater data density.

The radial position of the laser write spot relative to the groove is detected by means of the so-called "push-pull" or differential method. This method employs at least two radiation-sensitive detector-segments arranged in the path of the beam that has been reflected from the optical data storage medium so that the detector-segments receive radially different portions of the reflected beam. The difference between the output signals of the two detector-segments contains information about the radial position of the laser spot relative to the groove. If the output signals are equal, the center of the laser spot coincides with the center of the groove or the center between two adjacent grooves.

The push-pull signal may be calculated with scalar diffraction calculations as published in *Principles of Optical Disc Systems* by G. Bouwhuis, J. Braat, A. Huijser, J. Pasman, G. van Rosmalen, and K. Schouhamer Immink, Adam Hilger Ltd, Bristol (1985). Generally the push-pull signal is derived by subtracting the signals $I_1$ and $I_2$ from the right and left detector segment of a split detector which is present in the reflected light path of the radiation, e.g. laser, beam during scanning of the guide groove. In optical disk standard specifications the push-pull signal is normally defined as a normalized parameter $PPN=<I_1-I_2>/[I_1+I_2]$ in which formula $<I_1-I_2>$ denotes the maximum difference of $I_1-I_2$ and $[I_1+I_2]$ denotes the average value of $I1+I_2$ when the laser spot moves radially outwards across the guide grooves.

It has been found that specific dyes are very suitable for use as a recording layer on a pre-grooved optical data storage medium substrate. Such a dye may, for example, be a cyanine compound, which can be deposited by spincoating a solution of such a compound on the substrate surface. A reflection layer is usually present between the substrate and the dye layer.

In an organic dye-based recording stack, the recording process is more optimal when the dye volume in which the data are recorded is confined within the grooves present on the surface of the substrate. In case of a normal recording stack, i.e. a CD-R or DVD+R disk, the grooved sections that confine the dye are pointing towards the laser's entry surface of the disk. In the case of an inverted stack, the grooves are pointing away from the laser's entry surface; in this case the land sections, which are in between the grooves, are pointing towards the laser's entry surface. Such an inverted stack structure is used for a new BD-R disk. This means that for the BD-R system the radial tracking should switch from on-groove to in-groove for organic R-media.

BD was initially standardized by the BD Founders leading to the BD-RE v1.0 standard in June 2002. BD-RE media are Phase Change recordable media having low reflectivity and relatively low Push Pull, either SL or DL. After that, standardization of BD-Recordable started where commonality with BD-RE was kept as much as possible. Due to the low reflectivity, inorganic recording materials such as Phase Change type or Alloy type (Cu/Si) materials became feasible for BD-R. With these inorganic type BD-R media also the same normalized Push Pull (PPN) levels could be obtained as BD-RE (0.21-0.45). Inspired by the success in the market of CD-R and DVD±R, also spincoated dye media have been developed for BD-R. Initially they were of so-called on-groove type (see above) with High to Low mark polarity. However, these type of discs never reached the required recording characteristics. Recently, so called in-groove type dye BD-R discs have been developed showing Low to High mark polarity and high PPN levels. In contrast to the problems observed in the on-groove type media, excellent recording properties have been demonstrated on the newest type media. Triggered by the apparent promise of these media, the BD-R v1.0 standard has adopted a Disc Information (DI) byte reserved for mark polarity, thus enabling Low to High dye media in the future.

Due to the late availability of the Low to High dye media, they may not be compatible with first generation BD drives, which are designed with the conventional inorganic type BD-R media in mind. In Low to High dye media the following problems, all related to the PPN signal, are present:

1) The PPN signal is very high, e.g. 0.8, higher than the v1.0 BD-R specification, up to 3 times the level of inorganic BD-R media. Drives operating with conventional (8 segment photo diode) astigmatic focusing method suffer from high optical feed through. As a result the focus servo will suffer from unacceptably big focus error signals during track jump. This will jeopardize the robustness of the focus system and will cause dissipation in the focus actuator, possibly to the point where the focus coil may be burnt.

2) The PPN signal reduces after recording by a factor 2 or more. The BD-R spec only allows for a PPN ratio (after/before recording) of 0.75-1.25, enabling tracking on written as well as blank regions with a fixed radial servo gain. A lower PPN ratio requires a different servo design where the radial servo gain is switched, depending on the blank or written condition of the disc.

3) A more dramatic problem is seen on some of the latest sample media where the blank disc PPN signal is reduced and, as a consequence, the PPN signal after writing at a certain write power is reduced to the point where the PPN signal totally disappears.

Recently, it has become clear that the chances of achieving compatibility with the first generation drives (that operate the astimatic focusing method) are very slim. Problems 2) and 3) can be solved if the PPN requirement 1) is dropped and a relatively high blank disc PPN signal can be allowed.

It is now expected that BD-R dye disc development will focus on 2nd generation drives that have more advanced ways of dealing with optical feed through. This would lead to a new generation of media that lack compatibility with the first generation drives, not only for writing but also for reading. The latter is considered very serious: it would not only create confusion at the user side but could lead to damaged drives (burnt focus coils due to optical feed through).

It is an object of the present invention to provide an optical data storage medium of the kind described in the opening paragraph, which may be read by an optical data drive without causing damage to the drive.

It are further objects of the present invention to provide a corresponding apparatus and method.

The first object is achieved in accordance with the invention by an optical data storage medium as described in the opening paragraph, which is characterized in that the value of the normalized push pull signal PPN in the unrecorded information area is PPN-i and the value of PPN in the unrecorded user data area is PPN-u and PPN-i is lower than PPN-u.

The proposed solution is to modify the groove structure of the information area, in BD also called HFM zone or PIC band, of the Low to High BD-R disc in such a way that the value of the PPN signal is reduced only in the HFM zone to a level that is acceptable for even the first generation drives. This is possible because the HFM zone is essentially non-recordable. Those drives will be able to retrieve the Disc information (DI) simply by accessing the HFM zone and staying away from other parts of the Lead In Zone as well as the Data Zone. Starting up a BD disc by reading the PIC band is a way to avoid drive damage when reading out read-incompatible discs. In an embodiment of the optical information medium according to the invention the groove in the information area contains modulated information indicating a type of medium. E.g. the information is present stored in a mark polarity byte. E.g. a dye BD-R disc, as described above, has a mark polarity byte set to Low to High.

The very least what must be achieved is the ability of first generations drives to read the Disc Information (the mark polarity byte, version and class bytes) in order to properly identify the medium type, eject the disc and communicate an appropriate message to the user (recorder) or host (PC drive). This is especially important because the new dye discs may be able to damage the old drives. Preferably, in the information area, 0.21<PPN-i<0.52, more preferably 0.26<PPN-i<0.52. These values substantially correspond to the present standard values for a according to the BD-R V1.0 standard.

In an embodiment of the optical data storage according to the invention the groove in the information area has a reduced cross section in width, depth or both compared to the cross section of the groove in the user data area. It can be shown that a reduced groove cross section gives a reduced PPN signal. There are several ways in mastering of optical discs to change the information area (HFM zone) groove characteristics w.r.t. the user data groove area. Note that the HFM zone in BD already has a different track pitch compared to the groove area. The general idea is to reduce the "volume" of the pre-groove either in width or depth or both. This can be achieved by:

1) Changing the NA during optical disc mastering. This is relatively difficult because the NA used to master the conventional grooves is already very high.

2) Changing the groove depth and width by changing the light intensity during optical disc mastering. Reducing the intensity will in general result in a shallower, e.g. V-type, groove with a lower normalized Push Pull signal. It is also possible to change the PPN by prerecording the HFM zone with dummy data, e.g. a sequence of short pulses, during manufacture. This also decreases the value of the PPN signal.

In a typical BD example, the substrate is disk-shaped and has a diameter of 120 mm and a thickness of 1.0-1.2 mm. A recording stack is present on the substrate including a dye layer and a reflective layer. The reflective layer of the stack is present adjacent the substrate. This is also referred to as an inverted stack. The radiation, i.e. laser-light, beam enters via the side opposite from the side of the substrate through a transparent cover layer, screening the recording stack from the environment.

The guide groove is often constituted by a spiral-shaped groove and is formed in the substrate or transparent layer by means of a mould during injection molding or pressing. These grooves can be alternatively formed in a replication process in the synthetic resin of the spacer layer, for example, a UV light-curable acrylate.

The cover layer is made, for example, of polycarbonate, polymethyl methacrylate (PMMA), amorphous polyolefin or glass or a relatively thick layer of, for example, UV light-cured poly(meth)acrylate. This protective layer must be of good optical quality, i.e. substantially free from optical aberrations and substantially uniform in thickness. For BD this cover layer has a thickness of 0.1 mm.

The metal reflective layer may be provided by evaporation or sputtering. The dye layer is usually provided by spincoating.

The invention can be applied in BD-R discs, and in a future version of the BD-R standard. The invention can be used in order to achieve read compatibility of "old" BD drives with future dye type BD-R discs.

The second object is achieved in accordance with the invention by an apparatus for scanning an optical data storage medium as described above, the apparatus comprising an optical system for scanning tracks, being trackable by a focused radiation beam with the push pull method, a detector having a first segment for detecting a first signal from the reflected radiation beam and a second segment for detecting a second signal from the reflected radiation beam, characterized in that the apparatus comprises means for deciding, based on the medium information read in the information area, to accept the medium as compatible or reject the medium as incompatible.

The third object is achieved in accordance with the invention by a method of scanning an optical data storage medium as described above with an apparatus as described above, the medium comprising a dye based recording layer and having substantially parallel tracks for recording user information in a pattern of optically detectable marks, the tracks being provided with a groove in which information is stored, the groove being present in a user area and in an information area and being trackable, the apparatus comprising an optical system for scanning tracks by a focused radiation beam with the push pull method, a detector having a first segment for detecting a first signal ($I_1$) from the reflected radiation beam and a second segment for detecting a second signal ($I_2$) from the reflected radiation beam, characterized in that based on information read in the information area it is decided to accept the medium as compatible or reject the medium as incompatible.

In an embodiment of the method of the invention a compatibility status message is communicated to an end user of the apparatus.

Figure 2:
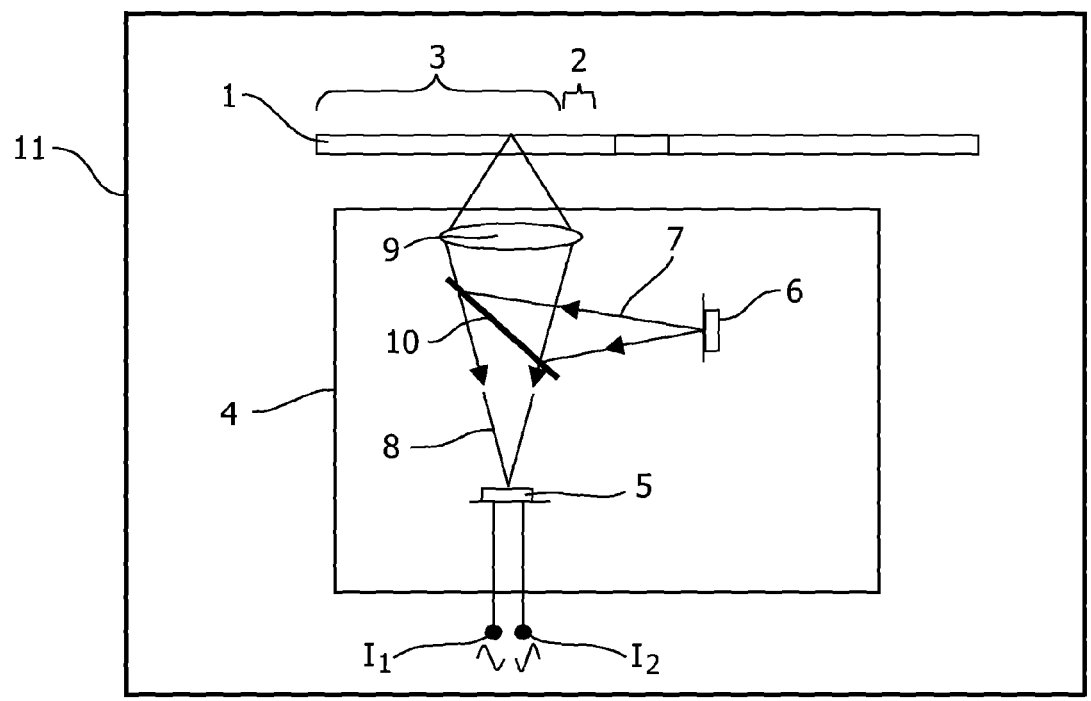
Figure 3:
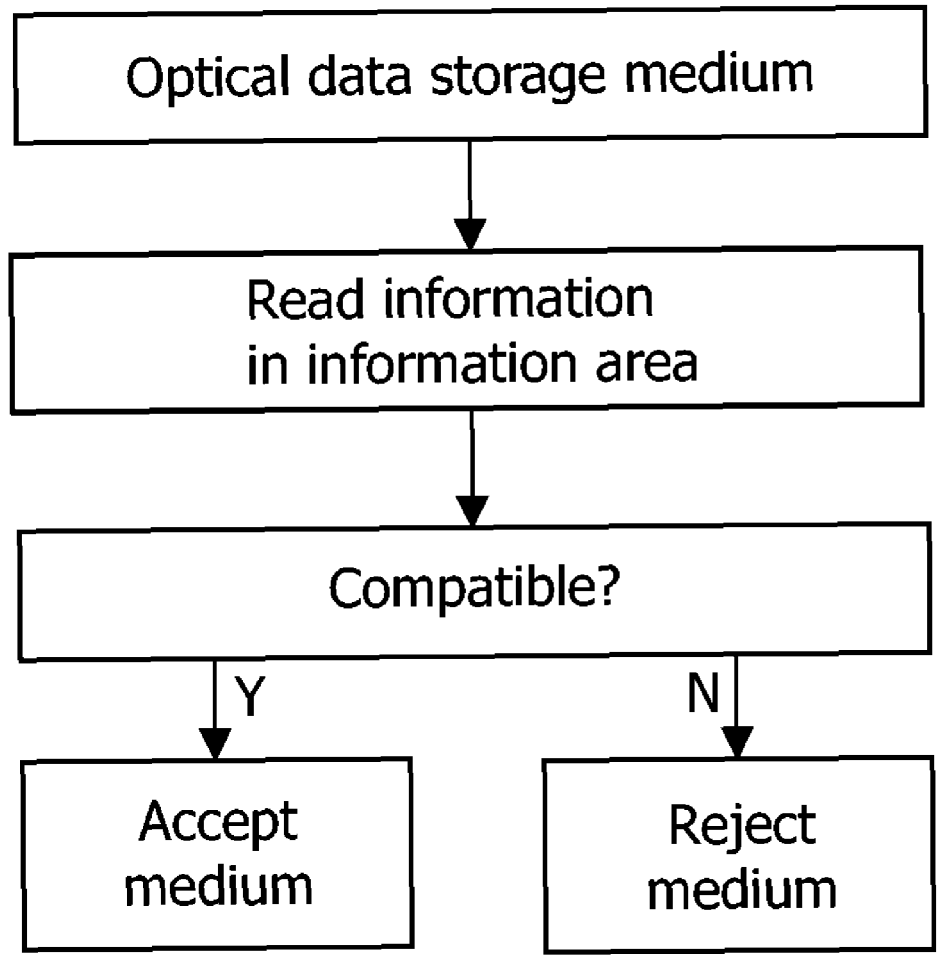

The invention will be elucidated in greater detail with reference to the accompanying drawings, in which FIG. 1 shows an optical data storage medium according to the invention, FIG. 2 shows an apparatus for reading out the optical data storage medium of FIG. 1, FIG. 3 shows the steps of a method for reading out the medium of FIG. 1 with the apparatus of FIG. 2.

In FIG. 1 an optical data storage medium (1) is shown. It comprises a dye-based recording layer and has substantially parallel tracks for recording user information in a pattern of optically detectable marks (not shown). The tracks are provided with a guide groove, which is present in a user data area (3) and in an information area (2) and is trackable by a focused radiation beam with the push pull method with normalized push pull signal (PPN). The value of PPN in the unrecorded information area is PPN-i and the value of PPN in the unrecorded user data area is PPN-u and PPN-i is substantially lower than PPN-u. The value of PPN-i is about 0.4. The value of PPN-u is about 0.6. This last value may cause damage when read by a "first generation" or "legacy" BD drive. The groove in the information area contains modulated information indicating a type of medium. The information is present stored in the mark polarity byte.

The groove in the information area has a reduced cross section in width, depth or both compared to the cross section of the groove in the user data area. There are several ways in mastering of optical discs to change the information area (HFM zone) groove characteristics w.r.t. the user data groove area. Note that the HFM zone in BD already has a different track pitch compared to the groove area. The general idea is to reduce the "volume" of the pre-groove either in width or depth or both. This can be achieved by:

1) Changing the NA during optical disc mastering. This is relatively difficult because the NA used to master the conventional grooves is already very high.

2) Changing the groove depth and width by changing the light intensity during optical disc mastering. Reducing the intensity will in general result in a shallower, e.g. V-type, groove with a lower normalized Push Pull signal. It is also possible to change the PPN by prerecording the HFM zone with dummy data, e.g. a sequence of short pulses, during manufacture. This also decreases the value of the PPN signal.

In FIG. 2 an apparatus (11) for scanning the optical data storage medium (1) of FIG. 1. is shown. The apparatus comprises an optical system (4) for scanning tracks, being trackable by a focused radiation beam (7) with the push pull method, a detector (5) having a first segment for detecting a first signal ($I_1$) from the reflected radiation beam (8) and a second segment for detecting a second signal ($I_2$) from the reflected radiation beam (8). The PPN signal is derivable form these signals as described in the introductory part above. The apparatus comprises means for deciding, based on the medium information read in the information area, to accept the medium as compatible or reject the medium as incompatible.

In FIG. 3 a flow diagram of a method, according to the invention, of scanning an optical data storage medium of FIG. 1 is shown using an apparatus as in FIG. 2. Based on information read in the information area it is decided to accept the medium as compatible or reject the medium as incompatible. Optionally a compatibility status message is communicated to an end user of the apparatus.

It should be noted that the above-mentioned embodiments illustrate rather than limits the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. An optical data storage medium (1) comprising a dye-based recording layer and having substantially parallel tracks for recording user information in a pattern of optically detectable marks, the tracks being provided with a guide groove, the groove being present in a user data area (3) and in an information area (2), the groove in the information area (2) having a reduced cross section compared to the cross section of the groove in the user data area (3), wherein the groove in the information area contains modulated information indicating a type of medium, the groove being trackable by a focused radiation beam (7) with a push pull method, and the value of the normalized push pull signal PPN in the unrecorded information area (2) is PPN-i and the value of PPN in the unrecorded user data area (3) is PPN-u, wherein PPN-i is lower than PPN-u.

2. An optical data storage medium (1) as claimed in claim 1, wherein the modulated information is stored in a mark polarity byte.

3. An optical data storage medium (1) as claimed in claim 1, wherein 0.21<PPN-i<0.52.

4. An optical data storage medium (1) as claimed in claim 1, wherein a unit-length volume of the groove in the information area (2) is less than a unit-length volume of the groove in the user data area (3).

5. An optical data storage medium (1) as claimed in claim 4, wherein the unit-length volume is determined by adjusting at least one of: a width and a depth.

* * * * *